(12) United States Patent
Schuck et al.

(10) Patent No.: US 10,884,438 B2
(45) Date of Patent: Jan. 5, 2021

(54) SAFETY WORKBENCH WITH CONTROLLED CIRCULATING AIR FLOW AND METHOD FOR ITS OPERATION

(71) Applicant: Thermo Electron LED GmbH, Langenselbold (DE)

(72) Inventors: Gerhard Schuck, Langenselbold (DE); Patrick Fanta, Langenselbold (DE); Gerd Ross, Langenselbold (DE); Oliver Rupp, Langenselbold (DE); Christoph Noll, Langenselbold (DE)

(73) Assignee: Thermo Electron LED GmbH, Langenselbold (DE)

( * ) Notice: Subject to any disclaimer, the term of this patent is extended or adjusted under 35 U.S.C. 154(b) by 0 days.

(21) Appl. No.: 16/433,529

(22) Filed: Jun. 6, 2019

(65) Prior Publication Data

US 2019/0377370 A1     Dec. 12, 2019

(30) Foreign Application Priority Data

Jun. 8, 2018   (DE) .......................... 10 2018 004 587

(51) Int. Cl.
*F24F 7/00*     (2006.01)
*F24F 11/00*    (2018.01)
(Continued)

(52) U.S. Cl.
CPC .............. *G05D 7/0676* (2013.01); *B01L 1/50* (2013.01); *B01L 9/02* (2013.01); *B25H 1/20* (2013.01);
(Continued)

(58) Field of Classification Search
CPC . G05D 7/0676; B01L 1/50; B01L 9/02; B01L 2003/0681; F24F 7/04
(Continued)

(56) References Cited

U.S. PATENT DOCUMENTS 3,426,964 A * 2/1969 Silvern ................. F01D 17/143
                                                    415/49
3,621,833 A * 11/1971 Crane .................. A61B 5/0806
                                                    600/533
(Continued)

FOREIGN PATENT DOCUMENTS

CN      1963402 A    5/2007
CN    101185932 A    5/2008
(Continued)

OTHER PUBLICATIONS

European Patent Office, European Search Report, Application No. 19176357.2, dated Nov. 13, 2019 (5 pages).

(Continued)

*Primary Examiner* — Helena Kosanovic
(74) *Attorney, Agent, or Firm* — Wood Herron & Evans LLP

(57) ABSTRACT

The present invention relates to a safety workbench having a work space surrounded by a housing having a work opening located in the housing front side and adjustable with an adjustable front panel for admitting into the work space an air inlet flow, an exhaust blower and a circulating air blower for conveying an air flow in the safety workbench, which are designed such that a partial air flow drawn in by the exhaust blower is filtered through an exhaust air filter as exhaust air flow from the safety workbench and a partial air flow drawn in by the circulating air blower through a circulating air filter as downwardly directed circulating air flow into the work space, and a control device, a differential pressure sensor (16) and two pressure transducers connected thereto which are designed to measure a pressure at two different positions within the safety workbench d, wherein a first of the pressure transducers is arranged in the immediate vicinity of the fan blades on the low pressure side of the circulating air blower and a second of the pressure trans- (Continued)

ducers is arranged in a low-flow area, on the low pressure side of the circulating air blower. The present invention further relates to a method of operating a safety workbench according to any of the preceding claims, comprising the steps of: a) determining a pressure difference between the first pressure transducer and the second pressure transducer by means of the differential pressure sensor, b1) comparing the pressure difference determined in a) with a nominal pressure difference stored in the control device, which corresponds to a nominal volume flow, or b2) converting the pressure difference measured in a) into an associated volume flow and comparing the calculated volume flow with one nominal volume flow stored in the control device, and c) regulating the circulating air blower such that the nominal volume flow is conveyed.

12 Claims, 3 Drawing Sheets

(51) Int. Cl.
    *F24F 13/00*     (2006.01)
    *G05D 7/06*     (2006.01)
    *B01L 1/00*     (2006.01)
    *B01L 9/02*     (2006.01)
    *B25H 1/20*     (2006.01)
    *F24F 7/04*     (2006.01)

(52) U.S. Cl.
    CPC ......... *F24F 7/04* (2013.01); *B01L 2300/0681* (2013.01)

(58) Field of Classification Search
    USPC .......................................................... 454/61
    See application file for complete search history.

(56) References Cited

U.S. PATENT DOCUMENTS

| | | | |
|---|---|---|---|
| 7,238,952 B2 * | 7/2007 | Ohtsuka | B82Y 10/00 |
| | | | 250/309 |
| 2003/0197450 A1 | 10/2003 | Ross | |
| 2007/0184769 A1 | 8/2007 | Lin | |
| 2008/0113599 A1 | 5/2008 | Ross et al. | |
| 2008/0318509 A1 * | 12/2008 | Ross | B08B 15/023 |
| | | | 454/61 |

FOREIGN PATENT DOCUMENTS

| | | |
|---|---|---|
| DE | 4441784 C2 | 5/1997 |
| EP | 1609541 A2 | 12/2005 |

OTHER PUBLICATIONS

German Patent and Trademark Office, Office Action, German Application No. 10 2018 004 587.1, dated Mar. 26, 2019 (5 pages).
State Intellectual Property Office of the People's Republic of China, Search Report, Application No. 201910488548.8, dated Apr. 14, 2020 (2 pages).

* cited by examiner

US 10,884,438 B2

SAFETY WORKBENCH WITH CONTROLLED CIRCULATING AIR FLOW AND METHOD FOR ITS OPERATION

CROSS-REFERENCE TO RELATED APPLICATION

The present application claims priority under 35 U.S.C. § 119 of German Patent Application No. 102018004587.1, filed Jun. 8, 2018, the disclosure of which is hereby incorporated herein by reference in its entirety.

FIELD OF THE INVENTION

The present invention relates to a safety workbench, in particular those for processing microbiological samples, as described, for example, in DE 44 41 784 C2, protect against contamination by bioaerosols that occur and are released during microbiological work.

BACKGROUND OF THE INVENTION

Within the safety workbenches, the contaminated air flows are continued by means of blowers as directed air flows and passed through filters which retain the contaminants from the air flow. At least part of the filtered air, after being purified in such a way as exhaust air volume flow, hereinafter referred to briefly as the exhaust air flow, is supplied to the outside air again.

Safety workbenches differ in their safety precautions and are built, tested and approved according to the various international standards. Among other things, safety workbenches provide personal protection or personal and product protection.

Safety workbenches that only provide personal protection are referred to as safety workbenches of class I, whereby personal protection is achieved by drawing in outside air through the work opening into the working area of the safety workbench. As long as this air inlet flow is not impeded and sufficient air is drawn in, particles and aerosols cannot escape from the interior of the safety workbench to the outside. The drawn-in outside air thus forms an air curtain which flows through the work opening and which protects the person working at the safety workbench or the environment from contamination by the particles.

Sufficient personal protection is a prerequisite for the operation of safety workbenches. This property, also referred to as retention capacity, of a safety workbench is defined, for example, by a precisely defined air inlet speed into the work opening. It is directly proportional to the exhaust air flow, so that changes in the exhaust air flow have a direct influence on personal safety and on the safety of the user.

Class II safety workbenches provide, in addition to personal protection, protection to working objects in the workbench against contamination from the outside or contamination by other samples in the workbench (so-called cross-contamination). The protection against this type of contamination is called product protection. Product protection results from the fact that part of the air flow drawn into the workbench is returned to the interior as circulating air flow after filtering. Typically, this circulating air flow is directed in a vertical downflow from top to bottom in the work space of the workbench. This circulating air flow, also referred to as displacement flow or "downflow", circulates around the objects located on the worktop and prevents contaminated air from outside or from other specimens from coming into contact with these objects. The circulating air flow in turn meets the air inlet flow flowing into the interior in the region of the intake opening, which is usually located at the front edge of the worktop, so that no particles can escape to the outside. Product protection, including protection against cross-contamination, is therefore largely achieved by the ratio between the downflow and the air inlet rate of the air inlet flow.

To generate these air flows, a standard class II safety workbench has an AC blower which draws in a total airflow from the working interior and blows it into a recirculating air filter and an exhaust filter. These filters are high-performance particulate filters, for example HOSCH, HEPA or ULPA filters, which are able to filter out the particles or microorganisms concerned from the air flow.

When commissioning such a safety workbench, the exhaust air flow to be exhausted from the device, i.e., the amount of air to be exhausted per unit time, is set to a nominal desired value via air flaps or via the flow resistance of the filters built into the device with the aid of a calibrated anemometer. Normally, about 65 to 70% of the total airflow drawn in from the workspace is recirculated as circulating air flow into the working interior and the remaining 30% to 35% is discharged as exhaust air flow to the room air or exhaust air systems leading out of the room.

Due to the system-related coupling of circulating air and exhaust air flow, it is not immediately possible for these safety workbenches to adjust the product protection independently of the protection of persons. Safety cabinets with separate blowers for air circulation and exhaust air have therefore been developed in the past which allow such a separate setting.

For this second type of safety workbench, first the personal protection and then the product protection are adjusted during commissioning. For this purpose, the delivery rate of the exhaust blower is also set via air flaps, filter resistors or a corresponding electrical adjustment of the output of the exhaust blower. The air inflow rate of the air inlet flow in the work opening, i.e., the protection of persons, results from the setting of the exhaust blower. After setting the exhaust blower, the flow rate of the circulating air flow directed downward is now set to adjust the product protection. However, this circulating air flow in turn has an influence on the air inlet speed of the air inlet flow, which is why the air inlet speed has to be re-checked and often has to be adjusted again. If necessary, a readjustment of the circulating and exhaust air blower must be carried out afterwards.

This alternating and iterative setting of the exhaust air blower and the circulating air blower is complex and dependent on the current flow conditions in the safety workbench or in the external exhaust air system in which the safety workbench is integrated. Therefore, even in known safety workbenches, the air inlet speed changes with increasing loading of the filter or with flow resistance changes due to, for example, disturbances in the external exhaust system. With an increasing load on the exhaust air filter, the exhaust air volume is reduced. Thus, the drawn-in outside air and, accordingly, the personal protection of the devices, decreases.

In EP 1 609 541 A2 of the Applicant, to which reference is expressly made with respect to the basic construction of the safety workbench according to one embodiment of the present invention, it has been proposed that to solve this problem by independently controlling exhaust blowers and circulating air blowers in such a way that in each case a predetermined nominal volume flow is maintained. To determine the current delivery rate of the respective blower, flow sensors are arranged behind the blower, which may be pressure boxes or anemometers. The flow values determined by the flow sensors are compared with the nominal volume flow stored for the respective blower. If a deviation is detected, the blower power is controlled so that the nominal volume flow is reached again.

The measurements carried out are based in practice on a differential pressure measurement between the intake and pressure side of the respective blower. As the Applicant's investigations have shown, these measurements also work quite reliably as long as the safety workbench, in particular the blowers and filters, operate under the given normal operating conditions. However, it has also been shown that erroneous volumetric flow determinations can occur if the pressure conditions within the safety cabinet change. In particular, increasing differences in the static pressures do not necessarily indicate a too low delivery volume of the blower. However, the increased pressure difference goes back to another cause, the control mechanism leads to excessive delivery, which is not desirable because of the associated higher energy consumption and increased wear on the blower. In addition, the predetermined volume flows of the blowers can shift toward one another, which can lead to a reduced personal and/or product protection. The alarm limits beyond which the safety cabinet should no longer be operated must therefore be relatively tight in order to ensure safe protection, but this leads to a shortened safe operating time and filters may need to be replaced more frequently than actually needed.

The errors described are particularly noticeable in the case of circulating air blower. This is mainly due to the different types of blower used for circulating air blowers on the one hand and exhaust blowers on the other hand. In the latter case, blowers with impellers curved forward and volute casings can be used. For these blowers, there are performance characteristics that give a clear relationship between a specific power consumption or a specific speed of the blower and the volume flow and static pressure supported by these parameters. For such blowers, one can therefore conclude with sufficient certainty the currently supported flow from the power consumption. These values can either completely replace the measurement of the pressure difference for the exhaust blower or be used for checking and correcting the pressure difference measured values. For circulating air blowers, which usually have backward-curved impellers and a different housing shape, there is no clear correlation between power consumption or fan speed and flow rate. For a regulation of the circulating air blower to a certain nominal volume flow, therefore, a sufficiently accurate determination of the volume flow actually conveyed is required.

Against this background, it is the object of the present invention to specify a safety workbench and a method for its operation, which allows a more accurate measurement of the volume flow delivered by the circulating air blower and thus a more accurate control of the circulating air blower and a safer operation of the safety workbench.

SUMMARY OF THE INVENTION

Thus, in its first aspect, the present invention relates to a safety workbench, which may be constructed in its basic structure like a conventional safety workbench and, in particular, as described in EP 1 609 541 A2. Thus, it has a work space surrounded by a housing into which an air inlet flow flows during operation of the workbench by means of a work opening located on the front side of the housing and changeable with an adjustable front window. The safety workbench according to one embodiment of the present invention also has an exhaust blower and a circulating air blower, which convey an air flow in the safety workbench. The partial air flow of the total air flow drawn in by the exhaust blower is passed through an exhaust filter and blown as exhaust air flow from the safety workbench, while the partial air flow of the total air flow drawn in by the circulation fan is blown through a recirculation filter as downwardly directed circulating air flow into the work space. Next, the safety workbench has a control device and a differential pressure sensor and two pressure transducers associated with this, which are designed to measure a pressure at two different positions within the safety workbench. In this case, a first of the pressure transducers is arranged in the immediate vicinity of the fan blades on the low-pressure side of the circulating air blower and a second one of the pressure transducers is arranged in a low flow region on the low-pressure side of the circulating air blower.

The essential difference between the safety workbench according to one embodiment of the present invention and the safety workbench known from EP 1 609 541 A2 therefore consists in the measuring arrangement for determining the volume flow of the circulating air blower. According to one embodiment of the present invention, a differential pressure sensor is used with two pressure transducers connected to it, wherein a first of the pressure transducers is arranged in the immediate vicinity of the fan blades, in contrast to EP 1 609 541 A2 on the low pressure side, i.e., the inflow side, of the circulating air blower. Compared with the known arrangement on the high pressure side of the blower, the arrangement of the pressure transducer in the immediate vicinity of the fan blades on the inflow has the advantage that the reduction of the dynamic pressure in the measuring position is directly proportional to the volume flow through the circulating air blower. Influences of other factors on the measurement result can be almost completely ruled out. As a comparison value against which the pressure difference is determined, the pressure is used, according to one embodiment of the present invention, which is measured by the second pressure transducer in a low-flow region on the low pressure side of the circulating air blower. Both measuring points for the first and second pressure transducers are thus, according to one embodiment of the present invention, on the low pressure side of the circulating air blower, while in the prior art, a pressure difference between the low pressure and high pressure side of the circulating air blower was determined. The second pressure transducer is expediently arranged in a region in which no turbulent flow is present, to the extent possible. Preferably, it is an area that is remote from the inlet opening of the circulating air blower, expediently in a low-perfusion and distant corner of the housing, or an area shielded by other components from the flow of the various blowers. In this area, a practically constant static pressure should prevail, which provides a solid basis for determining the pressure differences with respect to the pressure measured by the first pressure transducer on the fan blades of the circulating air blower.

The first pressure transducer is, as described, arranged in close proximity to the fan blades of the circulating air blower. According to one embodiment of the present invention, this means that the first pressure transducer is arranged as closely as possible to the fan blades, i.e., so close that the fan blades just do not touch it during rotation. This can be tested by installing the first pressure transducer by manually turning the fan blades. A suitable distance is, for example, at most 5 mm, preferably at most 3 mm, of that part of the fan blades, which comes closest to the pressure transducer.

The arrangement according to one embodiment of the present invention has the advantage of a very simple construction, which, however, is practically not susceptible to disturbing factors which actually have nothing to do with a change in the volume flow. Rather, the measured pressure difference is directly representative of the volume flow, which is conveyed by the circulating air blower. This relationship also exists for the entire range of volume flows that are relevant in the practical operation of the safety workbench. Therefore, the pressure difference values determined according to one embodiment of the present invention can be used very well for an exact regulation of the volume flow of the circulating air blower, thus, for example, for a control in which the volume flow of the circulating air blower is kept constant within predetermined volume flow limit values.

The measurement of the differential pressures is based on the following known conditions within the safety workbench: In conventional safety workbenches, the work space which can be closed by the moveable pane is usually spatially separated from the area in which exhaust air and circulating air blowers are arranged (hereinafter referred to as fan space). The fan chamber is usually located above the work space and is in flow communication with the latter via various flow passages. During operation, there is practically ambient pressure in the work space due to the relatively large work opening. Exhaust and circulating air blowers draw in air from the work space, which usually flows through a flow channel at the rear of the work space in the fan room, said rear being remote from the work opening. The air is accelerated and the pressure drops below the ambient pressure (typically around 35 Pa in the case of microbiological safety workbenches). In the inflow area of the blowers in the fan room, the air is again greatly accelerated and the static pressure energy is thereby converted into speed. The dynamic pressure is calculated as $0.5*density*air\ velocity^2$. The highest speeds and lowest static pressures prevail immediately in front of the blades of the impellers of the fans. The size of the further pressure reduction in this area depends on the structure of the respective safety workbench, for example its size, type and position of the blowers, etc., and is generally between 30 and 90 Pa. As it flows through the blower, energy is supplied to the air flow through the motor power, resulting in an increase in the static pressure in the area of the blower and in the area adjoining the blower. Using new filters, and a flow rate of about 0.3 m/s, typically results in a pressure increase of about 90 Pa from the ambient pressure.

As already described, according to one embodiment of the present invention, the pressure measurement by means of the first pressure transducer takes place directly on the fan blades of the circulating air blower in a region in which the highest flow velocity and the lowest static pressure prevail. This range is therefore well suited for determining pressure differences, since particularly high differences compared to the comparative values of the second pressure transducer can be achieved at the inherently low pressures in the two-digit Pascal range. This increases the accuracy of the results. In addition, the pressure transducer can be positioned so that the local pressure change correlates with the volume flow change in as wide a range as possible. This is important because the pressure drop in the airflow is proportional to the square of the flow velocity, but the velocity distribution across the cross-sectional area of the blower inflow or outflow opening is not uniform. Compared to the arrangement of a pressure sensor after the outflow opening of the circulating air blower, the measuring arrangement according to one embodiment of the present invention therefore also provides improved results.

However, in the arrangement of the pressure transducer in close proximity to the fan blades of the recirculation fan, it should be noted that the rotating fan blades generate periodic pressure changes which are measured by the pressure transducer and whose amplitude increases with increasing proximity to the fan blades. These fluctuations can have a negative effect on the control quality and should therefore be eliminated so that they are not taken into account in the control. The very rapid fluctuations due to the change of fan blade-clearance-fan blade-clearance, etc. can be eliminated or at least mitigated in various suitable ways, so that only an averaged differential pressure measurement result is received in the control of the blower power of the circulating air blower. One possibility consists in suitable fluid-mechanical measures, which lead to the fact that the pressure oscillations caused by the blade rotation do not act directly on the pressure sensor. Another measure is to attenuate or eliminate the oscillations of the measurement results by means of an electronic filter. Furthermore, a purely mathematical averaging of the fluctuations in results is possible. In this way, a pressure value independent of the short-term fluctuations due to the rotation of the fan blades is obtained in the region of the inlet of the circulating air blower. With this pressure value, and the comparison pressure value determined at the same time by the second pressure transducer in a low-flow region on the low-pressure side of the circulating-air blower, a differential pressure value is then determined, from which then, starting from an inflow opening with a constant cross-section, the volume flow delivered by the circulating-air blower at that time can be determined. This calculated volumetric flow can then be compared with a nominal volume flow stored in the control device. If a deviation from the nominal value is detected, the blower power is adjusted so that the desired nominal volume flow is again conveyed. Alternatively, the measured differential pressure value can also be directly compared with a stored nominal differential pressure, which is representative of a desired nominal volume flow, and the control can be carried out accordingly so that the desired volume flow is again conveyed.

In the manner described, largely free and accurate control of the operation of the circulating air blower of the safety workbench is possible by means of a simple and inexpensive differential pressure measurement of interference. In particular, the control can be carried out so that a substantially constant volume flow is conveyed through the circulating air blower. The regulation can generally be carried out as already described in principle in EP 1 609 541 A2, the differential pressure values determined according to one embodiment of the present invention being used only for controlling the circulating air blower.

Basically, all of the sensors of this type known and suitable from prior art can be used as differential pressure sensors. These can be placed directly at the desired measuring stations. Since, for space reasons, attaching the sensors at the measuring location is often only poorly possible or they can adversely affect the flow behavior, it is preferable not to attach the differential pressure sensors directly at the location of the pressure measurement, but rather to place only the pressure transducers and to connect the latter with the differential pressure sensor. Such differential pressure sensors are known from the prior art. They comprise the actual sensor and pressure transducer, of which at least one is connected by means of a pressure-transmitting connection, usually via a hose or a tube, with a pressure port in the sensor. This type of pressure difference sensors is preferably used within the scope of the present invention. Sensors in which at least one pressure transducer is connected to the sensor by means of a flexible plastic hose are particularly advantageous since these sensors are particularly easy to install. A measuring tube, for example, made of a dimensionally stable plastic, can be attached at the end away from the sensor, which improves the mountability and stability of the sensor assembly. Advantageously, therefore, the first pressure transducer includes a pressure transducer tube connected in particular via a plastic hose with the differential pressure sensor whose open end is located in the immediate vicinity of the fan blades of the circulating air blower. Expediently, the tube is aligned in the flow direction, whereby the surface of the inlet opening is perpendicular to the flow direction in order to disturb the flow as little as possible.

The second pressure transducer also expediently has either a tube connected in particular via a plastic hose to the differential pressure sensor whose open end is arranged in a low-flow region on the low-pressure side of the circulating-air blower. The same applies to the type of arrangement as for the first pressure transducer. In an alternative and, because of the reduced installation costs, preferred variant of the present invention, however, the differential pressure sensor is arranged in a low-flow area on the low pressure side of the circulating air blower. In this case, the comparison pressure value can be recorded directly with the differential pressure sensor, so that a (hose) connection to the second pressure transducer can be omitted. Instead, the second pressure transducer is then preferably a pressure port in the differential pressure sensor itself.

In addition to the first differential pressure sensor, in a preferred embodiment, a second differential pressure sensor is provided which, like the first sensor, is connected to a pressure sensor in the immediate vicinity of the fan blades on the low pressure side of the circulating air blower and a further pressure sensor in a low-flow region on the low pressure side of the circulating air blower. It is therefore appropriate to share parts of the first and second differential pressure sensor for the sake of simplicity, in particular the pressure transducer located near the fan blades. Specifically, therefore, first and second differential pressure sensors use the same first pressure transducer, which is correspondingly connected to both pressure sensors. It is particularly advantageous to use the connection, for example, in the form of a plastic hose, to the pressure transducer over as long a section as possible as a common connection to both pressure sensors and to provide a bifurcation in the vicinity of the pressure sensors, with which the connection (the plastic hose) is split into two separate supply lines, which are connected to the first and second differential pressure sensor. In the same way, a common second pressure transducer for both differential pressure sensors for determining the comparison pressure value could be connected to both sensors. However, as already described above, it is also preferable in this case to arrange the differential pressure sensors themselves in a low-flow area on the low pressure side of the circulating air blower and to carry out the pressure measurements directly via a pressure port of the sensor.

The purpose of the additional differential pressure sensor is to control the alarm limits of the circulating air blower. Alarm limits are understood to be the corresponding legal requirements defined, for example, in EN 12469 for the flow velocities of the air inlet flow (through the work opening into the safety workbench) and the displacement flow (downflow from top to bottom in the work space). Currently, minimum velocities of 0.25 m/s are specified for the displacement flow and 0.4 m/s for the air inlet flow. The intersection of the mean air inlet flow plotted against the mean displacement flow in a test diagram is referred to as the operating point of the safety workbench. At the operating point, the velocities of displacement and air inlet flow are optimal. When commissioning a safety workbench, the exhaust air and recirculating air blowers must be set so that the flow velocities are as close as possible to the operating point. The operating parameters of the respective blower, in which the specifications are still adhered to, represent the alarm limits for the respective blower. A deviation from these alarm limits, so that the specified minimum conditions are no longer safely met, leads to the output of an alarm signal. The second differential pressure sensor thus serves to control the proper operation of the circulating air blower according to the specifications. In the same way as in the case of the first differential pressure sensor, it is determined from the measured differential pressure values whether the delivery rate of the blower is sufficient to maintain the prescribed flow rates. However, unlike the case of the first differential pressure sensor, the control device only checks whether the alarm limits have been exceeded in order to trigger an alarm in this case.

For the same purpose, a third differential pressure sensor is preferably provided, which is connected to a pressure transducer in the region of the inflow opening of the exhaust blower and a further pressure sensor in a low-flow region on the low pressure side of the exhaust blower. The third differential pressure sensor is preferably arranged in the low-flow region, like the first two sensors, so that the comparison pressure values can be measured at a pressure port of the sensor itself. Alternatively, however, it is also possible to use two pressure transducers connected by means of hoses, for example. The third differential pressure sensor is useful to control the alarm limits of the exhaust blower. In principle, the procedure is the same as for the circulating air blower.

In principle, the third differential pressure sensor could also be used to determine differential pressure values for controlling the exhaust blower. In this case, a fourth differential pressure sensor for controlling the alarm limits of the exhaust blower would be useful. As already described, depending on the type of exhaust blower—in many cases, a simpler control based on the current consumption of the blower is possible, so that the more complicated control by means of differential pressure readings can be avoided. In the context of the present invention, however, the latter is also possible.

With regard to the operation of the safety workbench, in a further aspect, the present invention relates to a method for operating a safety workbench, as described above, comprising the steps:

a) determining a pressure difference between the first pressure transducer and the second pressure transducer by means of the differential pressure sensor, b1) comparing the pressure difference determined in a) with a nominal pressure difference stored in the control device that corresponds to a desired volume flow, or b2) converting the pressure difference measured in a) into an associated volume flow and comparing the calculated volume flow value with a nominal volume flow stored in the control device, and c) regulating the circulating air blower in such a way that the nominal volume flow is conveyed.

As already described, the nominal volume flow of the circulating air blower is that volume flow which is determined by the manufacturer of the safety workbench in accordance with the legal requirements for one or more operating points of the safety workbench. It is therefore possible to set a nominal volume flow only for a single operating point, or for each different operating point in each case its own nominal volume flow. The latter case, for example, allows the user to choose between different recirculating air flow levels. Depending on the selected level, the control device then regulates the circulating-air flow fan in such a way that the nominal recirculated-air flow is maintained corresponding to the selected level. The present invention will be described below using the example of a safety workbench with only one operating point and a nominal volume flow for the circulating air blower. For a safety workbench with several operating points, it is possible to proceed accordingly for each individual operating point.

The determined nominal value for the volume flow of the circulating air blower is stored in a manner known per se in the control device of the safety workbench. The nominal value can be stored directly as a volume flow value, that is to say delivered volume per unit time, or alternatively as a flow rate, pressure difference value or any other value that unambiguously defines the nominal volume flow. Similarly, in step b2), the measured pressure difference can be converted and compared with a corresponding stored nominal value not only in volume per unit time, but in any other value representative of the flow rate—such as the flow rate. By regulating the delivery rate of the circulating air blower to a specific nominal circulated air flow, it is possible to keep the circulating air flow constant, at a suitable value for product protection, said air flow flowing down into the interior of the safety workbench. Thus, air resistance changes occurring in the air circulation system, for example, resulting from the loading of the recirculation filter can be compensated by increasing the flow rate of the circulating air blower. For this purpose, the control device transmits, for example, when a deviation of the measured recirculating air flow is determined by the nominal volume flow, a control pulse with which the speed of the circulating air blower is increased until the measured value coincides again with the stored value.

Of course, in the context of the present invention, the observance of a predetermined desired value does not mean that this value is constantly maintained exactly. As with all control processes, the regulation of the delivery rates of the blowers of the safety workbench is based on the fact that a constant readjustment takes place at certain time intervals, if deviations from the target value are detected. In addition, a certain margin of deviation may be permitted from the outset, within which the operation is still recognized as permissible and no readjustment is required. Accordingly, the nominal value does not have to be a punctual value, but can also be a defined nominal value range. Certain defined deviations and fluctuations in the delivery rates of the blowers are therefore also possible in the safety workbench according to one embodiment of the present invention. However, the setting of the control device should be done such that the permissible deviations are as small as possible and do not impair the safe operation of the workbench.

It should be emphasized that, in particular in the case of large workbenches, the circulating air or exhaust fan may also each be a number of individual blowers, which are jointly actuated by the control device like a single blower. In an advantageous development of the safety workbench, both the exhaust blower and the circulating air blower are infinitely variable DC blowers. These particularly well-controlled direct current drives of the blowers make it possible to regulate the respective air flows evenly and finely even with a slow loading of the high-performance filters and thus to keep them essentially constant.

It should also be noted that keeping the circulating air flow constant is only required within the defined alarm limits. It is thus not necessary to maintain a precise relationship between the measured differential pressure and the volumetric flow over the entire measuring range, but it is sufficient if this relationship exists within the alarm limits around the preset, but in principle arbitrary, operating point or operating points. The constant maintenance (where appropriate, within the defined tolerances) of the set recirculation air flow must therefore take place only within the defined alarm limits, however, is also reliably possible with the control up to the alarm limits (upper and lower limit) according to one embodiment of the present invention. For the user, this has the advantage that an alarm is triggered only when a specified limit value of the pressure difference (or the volume flow or the flow velocity) is exceeded or has fallen short. Until then, the control automatically compensates for changes in the pressure conditions and keeps the air volume, delivered at the operating point by the circulating air blower, constant. The limitation of the constant control to the operating point of the safety workbench also reduces considerably the effort and cost involved in the design and tuning of the blower, inlet nozzles and pressure measuring devices.

It has already been described that the constant regulation of the circulating air flow is expediently carried out in the area defined by the alarm limits. By means of the control method according to one embodiment of the present invention, the circulating air blower can be regulated over a long period of time so that a volume flow is maintained in the defined nominal value range. However, due to increasing clogging of the recirculating air filter or for similar reasons, at some point the time comes at which, despite readjustment of the blower, the desired nominal value for the volume flow can no longer be achieved. At this time, as is generally known from the prior art, an alarm is issued expediently to warn the user that safe operation of the safety workbench is no longer guaranteed. Accordingly, the method according to one embodiment of the present invention is configured in a preferred variant of the method such that an upper and a lower limit value for a nominal pressure difference and/or a nominal volume flow are stored in the control device and the control device initiates the output of an alarm if the upper limit value is exceeded or the lower limit value has fallen short. In this case, and in principle within the scope of the present invention, the limit values for the nominal volume flow include not only the indication of the flow volume per time, but also the specification of the flow rate, which is representative of the nominal volume flow because of the fixed inflow cross section into the blower. As already described in connection with the structure of the safety workbench, a deviation from the limit values is preferably determined by means of a second differential pressure sensor, which exists in addition to the first pressure difference sensor, which determines the size of the delivered volume flow via the measurement of the pressure difference for controlling the circulating air blower.

In EP 1 609 541 A 2, the advantages of the independent control of circulating air and exhaust blowers have already been described in detail. In order to obtain these advantages in the context of the present invention as well, an independent regulation of the exhaust blower is also preferably carried out for the regulation of the circulating air blower.

However, as already described, the regulation of the exhaust blower does not have to take place via a pressure difference measurement. The determination of the nominal exhaust air flow, usually taking into account the environmental conditions of the safety workbench, and the control of the exhaust blower can basically be carried out as already described in EP 1 609 541 A 2. In addition, alarm limits are set in the usual way as the upper and a lower limit for the operation of the exhaust blower and stored in the control device. As in the case of the circulating air blower, these limit values can be defined as pressure difference values or volume flow values (volume per time or flow rate). To check whether these limits are met or not during operation of the safety workbench, a third differential pressure sensor is preferably provided, which operates in principle like the differential pressure sensors already described. The measured values determined by the third differential pressure sensor are transmitted to the control device, which evaluates whether the upper limit value has been exceeded or the lower limit value is undershot. If this is the case, the control device causes the output of an alarm, for example, in the form of an optical and/or acoustic signal.

The safety workbench according to one embodiment of the present invention in this way not only provides for a reliable compliance with personal and product protection largely independent from external influences, but rather already facilitates the setting of the basic operating parameters. Since the recirculation and the exhaust blower are controlled independently of each other, and depending on the exhaust air or the recirculation filter actually leaving air flows, the air inlet rate of the incoming air inlet flow remains substantially constant even when adjusting the circulating air flow. An elaborate adjustment of the exhaust air volume flow after adjustment of the product protection is eliminated.

If the safety workbench according to one embodiment of the present invention is connected to an external exhaust air system, it is always optimally adjusted because of the control of the exhaust air flow leaving the filter for flow resistances changing in the exhaust air system. More specifically, these air resistance changes are automatically compensated by the control device so that always a substantially constant exhaust air volume flow leaves the safety workbench. Such changes in the flow resistance in an exhaust air system arise, for example, when several safety workbenches are operated together on an exhaust air duct and individual safety workbenches are switched on or off. When using workbenches according to one embodiment of the present invention, such fluctuations do not lead to a deterioration of the personal or product protection of the individual safety workbench, since the latter automatically readjusts its exhaust air flow. When operating several safety workbenches according to one embodiment of the present invention on a common exhaust air system, it is possible to switch off each individual safety workbench, if it is no longer to be operated, without appreciably influencing the air flow systems of the safety workbenches that are still in operation. Pressure fluctuations within the exhaust air system also occurring for other reasons are absorbed by the safety workbench according to one embodiment of the present invention without disadvantages for personal and product protection.

To further improve operational safety, a flow sensor may additionally be provided for measuring the outside air flowing through the work opening.

Advantageously, the safety workbench also has a measuring device for measuring the position of the front panel. In order to enable safe operation, the front panel must not remain too wide open for a longer period of time, because if the opening of the work opening is too large, the required air flows cannot be maintained and personal and product protection cannot be ensured. The measuring device can, for example, have electrical contacts arranged directly on the lower edge of the front panel, which represent the position of the front panel edge in its guides. However, other suitable measuring devices can also be used. Such measuring devices are basically known in the art and need not be described in detail here. Advantageously, ranges of values are specified for the measurement parameters described in the control device, which indicate within which framework the safety workbench can be operated safely and reliably or in accordance with legal or other regulations. These safety marginal ranges are preferably monitored in addition to the measurement parameters required for the blower control in order to achieve a particularly high level of operational safety of the safety workbench. The additional monitoring of the exhaust air flow velocity, recirculation air flow rate and air inlet rate within predetermined limits ensures that the safety workbench is not operated unnoticed in improper condition. The same applies to the monitoring of the position of the front panel. If the safety system of the safety workbench monitoring this parameter determines a deviation from the predetermined position, it is expedient to output an acoustic and/or visual alarm.

In addition, the safety workbench preferably also comprises at least one measuring device which determines the power consumption and/or the rotational speed of the exhaust blower, the circulating air blower or both blowers. These measurement results are forwarded to the control device at predetermined time intervals and evaluated there. For this purpose, value ranges can be stored in a memory unit of the control device, which indicate within which limits the power consumption or the rotational speed of the respective blower should lie. Then, for example, the control device is programmed so that the blowers are operated only within the operating ranges stored for them. This can prevent the blowers from being damaged, for example, due to excessive power or excessive speed. If operation under the given conditions is not possible, the safety system of the workbench may cause an audible and/or visual alarm. In addition, as in all other alarms, the cause of the alarm output can be displayed on a display or in some other suitable way. The cause of a "blower alarm" can be, for example, that due to a heavily loaded filter, the power of the blower would have to be so high in order to ensure the desired delivery volume that this is no longer possible with the maximum permissible speed or the maximum permissible power consumption.

The safety monitoring system of the safety workbench expediently also has facilities for monitoring the functionality of essential components of the safety workbench. In addition, for compliance with predetermined operating parameters, it is thus monitored whether certain components of the safety cabinet are even ready for operation. Preferably, at least one of the components of the differential pressure sensors, flow sensors, exhaust blower, circulating air blower, control device and power supply of the safety workbench is monitored by the safety monitoring system. To ensure safe operation of the workbench, it is expedient to monitor several or all of these components regularly for their undisturbed operability. If a failure or a defect of even one of the monitored components is noticed, an optical and/or audible alarm is issued. Of particular advantage is the monitoring of the control device by an independent safety monitoring system, since this ensures that the air rates controlled by the control system in the respective areas of the safety workbench comply with the specifications and sufficient personal protection is guaranteed.

BRIEF DESCRIPTION OF THE DRAWINGS

The present invention will be described in more detail with reference to a drawing. The figures contained therein are merely illustrative of preferred embodiments of the present invention, without the present invention being limited to these examples. Like reference numerals designate like parts, wherein not always all parts of a figure must be provided with a reference numeral. The figures show schematically.

DETAILED DESCRIPTION OF THE INVENTION

Figure 1:
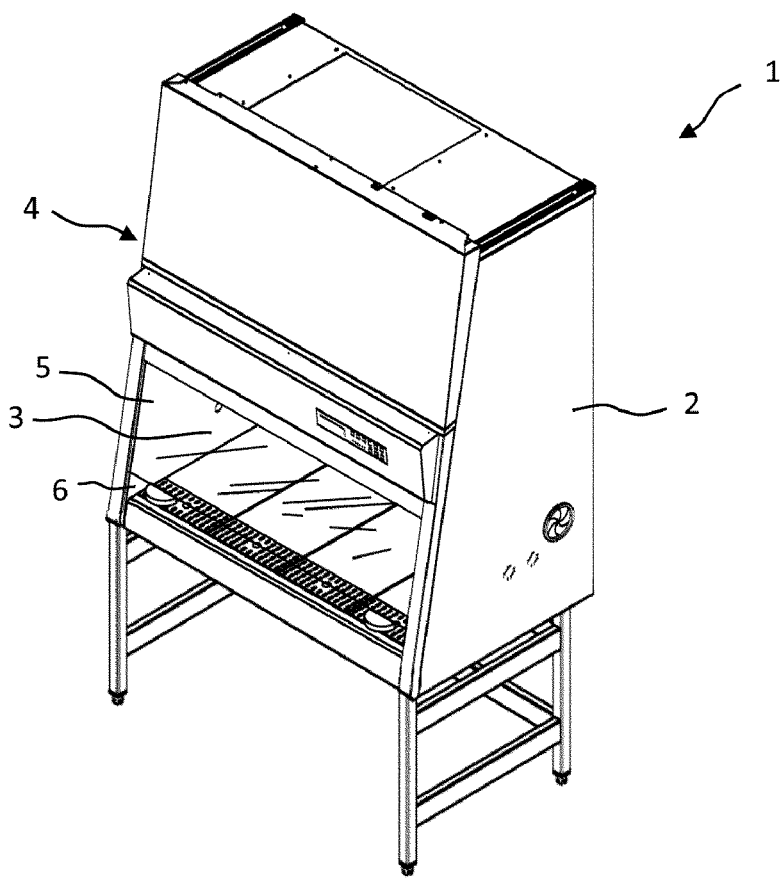
FIG. 1 shows an embodiment of a safety workbench according to the present invention.
Figure 2:
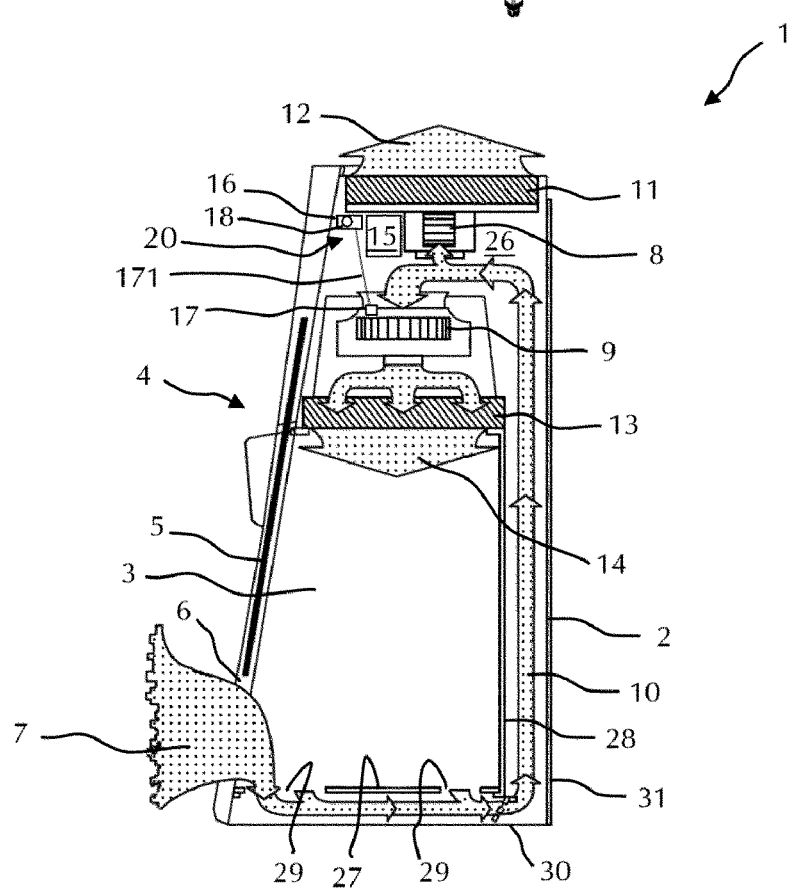
FIG. 2 shows a side view of the safety workbench according to the present invention shown in FIG. 1 in the interior.

FIGS. 1 and 2 show a safety workbench 1 according to one embodiment of the present invention, which can be used, for example, for processing microbiological cultures. In its basic structure, the safety workbench 1 corresponds to what is known from the prior art. The safety workbench 1 has a housing 2 which surrounds a working interior 3. At the front of the housing 4, an adjustable front panel 5 is arranged. The front panel 5 is mounted so that it can be moved up and down substantially parallel to the housing front 4. By pushing down the front panel 5 located on the housing front side, the work opening 6 can be reduced in size. The height of the work opening 6 thus results from the gap between the underside of the front panel 5 and the work space bottom plate 27 of the housing 2.

The housing 2 is usually constructed with two shells, so that the housing itself at least partially serves as a ventilation duct for the air currents circulating in the safety cabinet. The work space bottom plate 27 exhibits intake openings 29 arranged in the area of the work opening 6 and near the work space rear wall 28. An outer bottom plate 30 extends below the work space bottom plate 27. In the intermediate space or ventilation duct enclosed by these two plates 27, 30, an air flow 10 flows from the front side 4 in the direction of the rear wall of the housing. In the further course of the flow, the air flow 10 is passed through the gap upwardly between the work space rear wall 28 and outer rear wall 31. Above the working interior 3, the exhaust blower 8 and the circulating air blower 9 are located in a fan room 26, each drawing in the partial air flows of the air flow 10. The thickness of the flow arrows 10 in FIG. 2 clearly illustrates the different volumes of the respective air flows.

The air drawn in by the circulating air fan 9 and guided by the circulating air flow 14 conducted through the circulating air filter 13 is blown downward into the working interior 3. The circulating air filter 13 is, for example, a conventional HEPA filter that filters impurities such as microorganisms out of the circulating air and thus prevents contaminants from being carried back into the working interior 3 with the circulating air flow 14. The circulating air flowing from top to bottom forms a substantially vertical curtain in front of the work opening 6 and between samples arranged in the working interior 3 and thus contributes to product protection.

The exhaust air flow 12 is supplied through the exhaust blower 8 via an exhaust filter 11 from the environment of the safety workflow 1 or a building's own exhaust system, which is not shown here. The exhaust air filter 11 may again be a conventional filter such as a HEPA filter. It prevents microorganisms or other contaminants from being carried out of the safety workbench 1 with the exhaust air. The exhaust air 12 led out of the safety cabinet 1 is replaced by an air inlet flow 7 flowing through the work opening 6 in the working interior 3. This air flow provides personal protection and prevents, if it is sufficiently adjusted, impurities from escaping from the safety workbench 1 through the work opening 6.

The maintenance of a sufficient air inlet flow 7 and circulating air flow 14 is effected by appropriate control of the air currents. For this purpose, a control device 15 is present in the safety workbench 1. In the control device 15, nominal values were stored before commissioning the safety workbench 1, which specify which exhaust air volume per unit time should be conveyed by the exhaust blower 8 and which recirculation volume should be conveyed by the circulating air fan 9. The nominal values can be stored as volume-per-time values, flow rates or pressure difference values. The control device 15 controls the power supply of the exhaust blower 8 and the circulating air blower independently of each other so now that an exhaust air volume flow and a recirculation air flow are conveyed, the size of which corresponds to the respective nominal value, if appropriate within specified tolerances.

In order to actually be able to determine the volume flow conveyed by the circulating air blower, and to be able to compare this value with the stored nominal value, a differential pressure sensor 16 is arranged in the safety workbench. This determines at predetermined time intervals the delivered volume flow via a pressure difference measurement and sends the measured values to the control device 15. This compares the measured value and the nominal value. If the measured value is smaller than the desired value, the control device 15 increases the conveying capacity of the circulating air blower 9 until the value corresponding to the desired volume flow is ascertained at the differential pressure sensor 16. Conversely, the speed of the blower 9 is reduced if the volume flow is too high. The control circuit is shown schematically in FIG. 3.

According to one embodiment of the present invention, the differential pressure sensor 16 has two pressure transducers 17, 18 connected to it, with which the pressure can be measured at two different positions within the safety workbench. Here, the first pressure transducer 17 is arranged in the immediate vicinity of the fan blades of the circulating air blower 9 on the low pressure side 91. The second pressure transducer 18 is also located on the inlet side (low pressure side 91) of the circulating air blower 9, but in a low-flow region 20. The pressure difference measured between the two pressure transducers 17 and 18 is directly proportional to the volume flow conveyed through the circulating air blower 9. Therefore, the measured pressure difference can be used directly as a measurement for the comparison in the control device 15, where it is compared with a nominal pressure difference, which corresponds to the pressure difference that occurs when conveying the nominal volume flow. But alternatively, the pressure difference can be converted also into the associated volume flow (volume per time) or the corresponding flow rate, which is also directly proportional to the delivered volume flow because of the constant inlet cross-section of the circulating air blower 9, and be compared with a corresponding nominal volume flow or a nominal flow rate in the control device 15.

Figure 4:
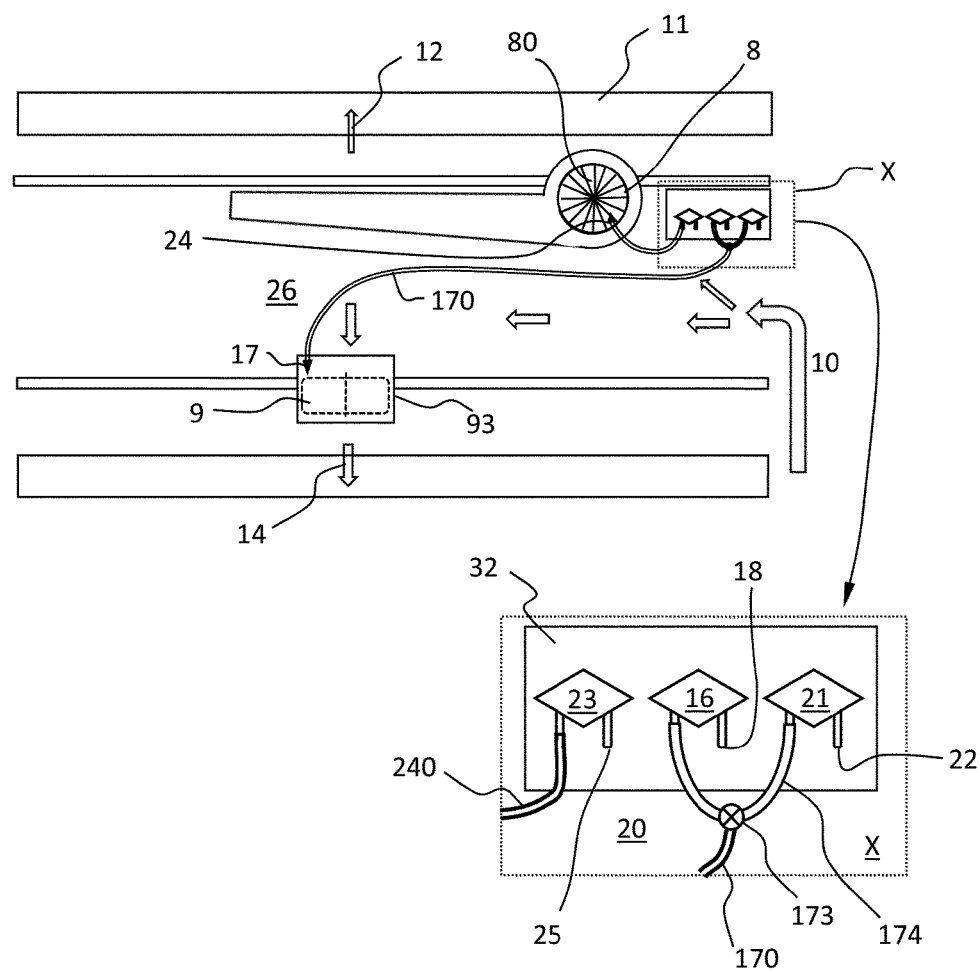
FIG. 4 shows a first embodiment of the arrangement of the differential pressure sensors.
Figure 6:
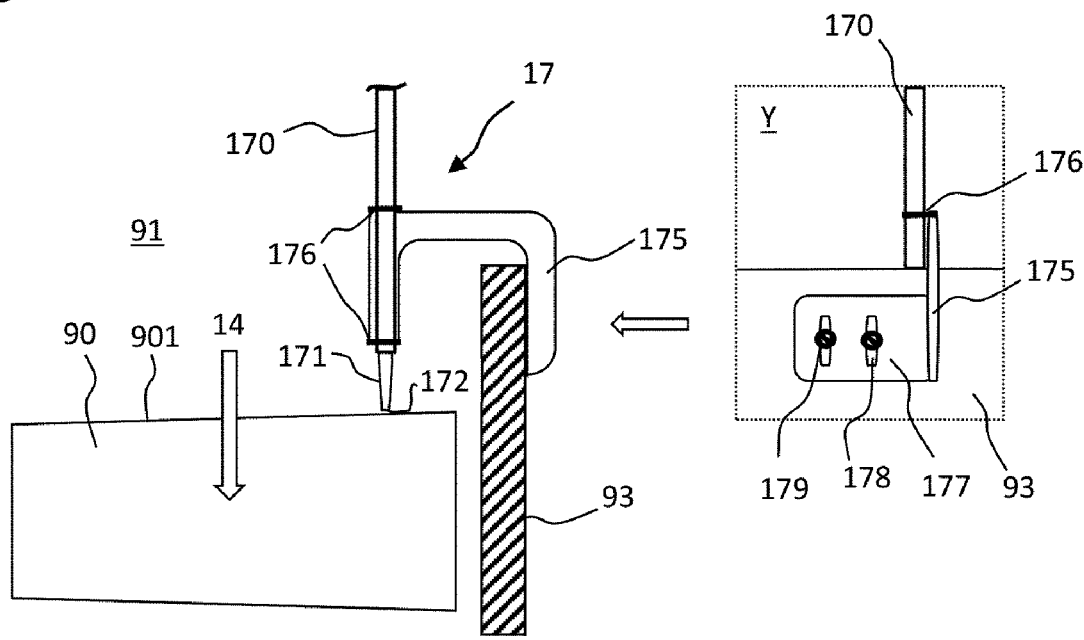
FIG. 6 shows an example of the arrangement of a pressure transducer with respect to a fan blade.

FIG. 4 shows a first possible arrangement of the differential pressure sensor 16 with the associated pressure tranducers 17 and 18. The first pressure transducer 17 is located directly above the fan blades of the circulating air blower 9 arranged in a housing 93. As can be seen from the enlarged illustration in FIG. 6, the pressure transducer 17 has a plastic tube 171 which is inserted at one end into a plastic tube 170, which in turn is connected to a pressure port of the differential pressure sensor 16 (see enlarged detail X in FIG. 4). The open end 172 of the tube 171 is located virtually immediately above the upper edge 901 of one of the fan blades 90 of the circulating air blower 9. The distance is just sufficient so that the tube 171 does not touch the fan blades when the circulating air fan 9 is put into operation. This can be tested during assembly of the pressure transducer 17 on the housing 93 of the circulating air blower by manually turning the fan wheel. The distance between tube 171 and upper edge 901 is preferably at most 5 mm, in particular at most 3 mm.

For fixing the pressure transducer 17 in the position shown, a holder 175 is provided, one end of which has a retaining plate 177 extending parallel to the outer edge of the housing 93, in which two slots 178 are provided which allow alignment of the holder 175 in a suitable position, in which the holder is fixed by means of screws 179 on the housing 93. The position is, apart from the correct height, chosen so that tube 171 and the end of the hose 170 connected thereto are aligned substantially in the flow direction of the circulating air flow 14. In this way, the pressure transducer 17 causes the least disturbance to the circulating air flow. For attachment of the hose end and the tube 171, the holder 175 has two superimposed bent retaining tabs 176 with holes through which the hose 170 can be pushed. The attachment takes place, for example, by means of cable ties with which the tube 171 can be securely fixed in the hose 170.

In the case shown in FIG. 4, the differential pressure sensor 16 is mounted on a sensor board 32, which in turn is connected to the control device 15. The sensor board 32 is arranged in a low-flow region 20 of the fan chamber 26, whereby the board itself shields the sensors arranged on it against the flow caused by the blowers 8 and 9. Since the differential pressure sensor 16 is located in a low-flow region 20 on the inflow side 91 of the circulating air blower, it is not necessary to guide the second pressure transducer 18 by means of a plastic hose into a low-flow region. Rather, the second pressure port of the differential pressure sensor 16 can serve directly as a second pressure transducer 18. This reduces the assembly effort.

Figure 5:
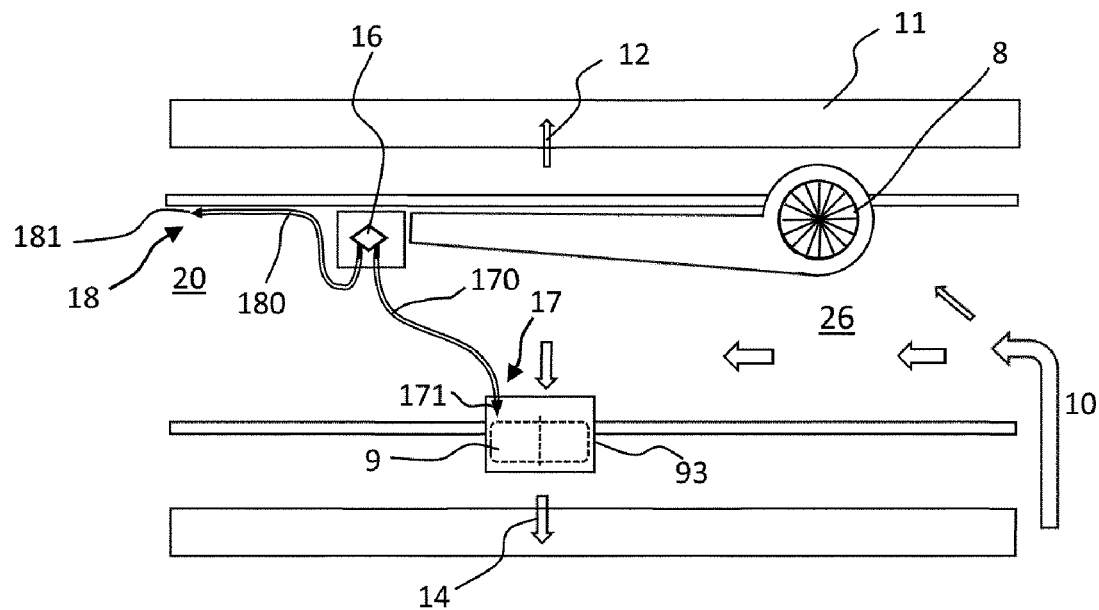
FIG. 5 shows an alternative embodiment to FIG. 4.

Alternatively, however, it is also possible to design both the first pressure transducer 17 and the second pressure transducer 18 in the form of tubes, which are connected by means of hose connections to the pressure ports of the differential pressure sensor 16. This possibility is shown in FIG. 5. The design of the first pressure transducer 17 corresponds to that which has been described in connection with FIG. 4. The second pressure transducer 18 here also consists of a plastic hose 180, in whose end, remote from the differential pressure sensor 16, a plastic tube 181 is inserted. This plastic tube opens into a low-flow region 20 at the side edge of the fan chamber 26.

In FIG. 4, in addition to the first differential pressure sensor 16, a further differential pressure sensor 21 is arranged on the sensor board 32. Its first pressure transducer also measures the pressure in the immediate vicinity of the circulating air blower 9. To reduce the assembly work, the first pressure transducer 17 of the differential pressure sensor 16 is also used for this pressure measurement. The common use of the plastic tube 171 and of a large part of the plastic hose 170 is achieved by attaching a bifurcation 173 in the vicinity of the differential pressure sensors 16 and 21. The bifurcation, for example a plastic Y-tube piece, divides the plastic hose 170 into two tube sections, from which the hose section 174 leads from the bifurcation 173 to one of the pressure ports of the differential pressure sensor 21. The measurement of the comparison pressure in the low-flow region 20 takes place directly via the second pressure port 22. The second differential pressure sensor 21 thus basically measures the same pressure differences as the first differential pressure sensor 16. However, the pressure difference values measured by it do not serve to regulate the circulating air blower 9, but to control its alarm limits. The measured pressure differences are thus compared in the control device 15 with an upper and a lower limit, which define the permissible working range of the circulating air blower 9. If the differential pressure sensor 21 transmits a pressure difference value which corresponds to a volume flow, which is outside the working range of the circulating air blower defined by the limit values, the control device 15 evaluates this as an error and initiates, in a manner known per se, the outputting of an alarm. This is also schematically illustrated in FIG. 3, where the error of the circulating air blower 9 is indicated by the arrow symbol 40. In the case shown, the control device 15 is also followed by a safety device 43, which causes the output of the alarm signal 41, here in the form of an optical signal.

In the safety workbench according to one embodiment of the present invention, not only the delivery rate of the circulating air blower but also that of the exhaust blower 8 is appropriately regulated. For this purpose, as for the circulating air blower, a differential pressure sensor corresponding to the differential pressure sensor 16 can be used. However, it is simpler and therefore preferred to regulate the exhaust blower in a manner known per se as a function of its power consumption. The third differential pressure sensor 23 illustrated in FIG. 4 is therefore not for the control of the exhaust blower 8, but—as the differential pressure sensor 21—to monitor its alarm limits. The pressure sensor 24, which is arranged on the inlet side of the exhaust blower 8 in the region of its inflow port 80 and connected via a plastic hose 240 to a first pressure port of the differential pressure sensor 23, is basically constructed like the pressure transducer 17. The second pressure port of the differential pressure sensor 23 is used as a second pressure transducer 25. The monitoring of the alarm limits and the output of an alarm signal are analogous to those described for the circulating air fan 9.

In order to be able to achieve compliance with the nominal stored volume flow values, the window position in the safety workbench 1 is preferably also monitored. Too large a work opening 6 would complicate compliance with the nominal values, if not make it impossible. For this reason, in the area of the work opening 6 there is a measuring device 42 (shown only in FIG. 3) which determines the current window position and sends the measured value to the safety device 43. The safety device 43 may be spatially integrated into the control device 15. If the window position deviates from the position permitted for safety operation, the safety device 43 causes the alarm device 41 to emit an audible and/or visual signal which should cause the user to lower the front panel 5.

Figure 3:
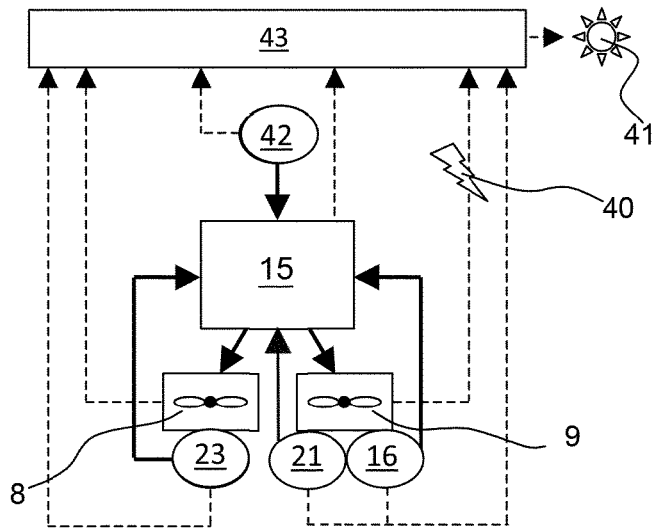
FIG. 3 shows a circuit diagram for describing the method according to the invention for operating a safety workbench according to the present invention.

In addition to the front panel, the safety monitoring system 43 expediently monitors the control device 15 as well as the differential pressure sensors 16, 21 and 23, the fans 8, 9 and the measuring device 42. In FIG. 3, the feedback messages associated with the security system 43 are shown as dashed arrows. If one of the components does not function properly, the safety device 43 also causes the alarm device 41 to issue an alarm signal.

While the present invention present has been illustrated by description of various embodiments and while those embodiments have been described in considerable detail, it is not the intention of Applicants to restrict or in any way limit the scope of the appended claims to such details. Additional advantages and modifications will readily appear to those skilled in the art. The present invention in its broader aspects is therefore not limited to the specific details and illustrative examples shown and described. Accordingly, departures may be made from such details without departing from the spirit or scope of Applicants' invention.

What is claimed is:

1. A safety workbench comprising a work space surrounded by a housing having a work opening located in a housing front side and adjustable with an adjustable front panel for admitting into the work space an air inlet flow, an exhaust blower and a circulating air blower for conveying an air flow in the safety workbench which are designed such that a partial air flow drawn in by the exhaust blower is filtered through an exhaust air filter as exhaust air flow from the safety workbench and a partial air flow drawn in by the circulating air blower through a circulating air filter as downwardly directed circulating air flow into the work space, and a control device, a differential pressure sensor and two pressure transducers connected thereto which are designed to measure a pressure at two different positions within the safety workbench,
wherein a first of the pressure transducers is arranged in an immediate vicinity of fan blades of the circulating air blower on a low pressure inflow side of the circulating air blower, and a second of the pressure transducers is arranged in a low-flow region on the low pressure inflow side of the circulating air blower, with the low-flow region being located remote from an inflow opening of the circulating air blower.

2. The safety workbench according to claim 1,
wherein the first pressure transducer comprises a tube connected with the differential pressure sensor by way of a plastic hose, an open end of which is arranged in the immediate vicinity of the fan blades of the circulating air blower.

3. The safety workbench according to claim 1,
wherein the second differential pressure transducer either comprises a tube connected to the differential pressure sensor via a plastic hose having an open end arranged in the low-flow region on the low-pressure inflow side of the circulating air blower, or the differential pressure sensor is arranged in the low-flow region on the low-pressure inflow side of the circulating air blower and the second pressure transducer is a pressure port in the differential pressure sensor.

4. The safety workbench according to claim 1,
wherein a second differential pressure sensor is provided which is connected with a pressure transducer in the immediate vicinity of the fan blades on the low pressure inflow side of the circulating air blower and with a further pressure transducer in the low-flow region on the low pressure inflow side of the circulating air blower.

5. The safety workbench according to claim 4,
wherein the pressure transducer arranged in the vicinity of the fan blades is the first pressure transducer according to claim 1, and a connection in a form of a plastic hose between the first pressure transducer and the differential pressure sensor has a bifurcation from which a connection in a form of a further plastic hose runs to the second differential pressure sensor.

6. The safety workbench according to claim 4,
wherein a third differential pressure sensor is provided that is connected with a pressure transducer in a region of an inflow opening of the exhaust blower and with another pressure transducer in the low-flow region on the low-pressure inflow side of the exhaust blower.

7. The safety workbench according to claim 1,
wherein exhaust blower and the circulating fan are arranged in a fan space that is spatially separate from the work space.

8. A method for operating a safety workbench according to claim 1, comprising the steps:
a) determining a pressure difference between the first pressure transducer and the second pressure transducer by means of the differential pressure sensor,
b1) comparing the pressure difference determined in a) with a nominal pressure difference stored in the control device which corresponds to a nominal volume flow, or
b2) converting the pressure difference measured in a) into an associated volume flow and comparing the calculated volume flow value with a nominal volume flow stored in the control device, and
c) regulating the circulating air blower such that the nominal volume flow is conveyed.

9. The method of claim 8,
wherein an upper and a lower limit for a nominal pressure difference and/or a nominal volume flow are stored in the control device and the control device causes the issuance of an alarm, if the upper limit is exceeded or the lower limit has fallen short.

10. The method of claim 9,
wherein the control of the capacity of the circulating air blower takes place in a range between the upper and lower limit.

11. The method of claim 9,
wherein the deviation from the limit values by means of the second differential pressure sensor is detected.

12. The method according to claim 9,
wherein in the control device, an upper and a lower limit for a target pressure difference and/or a target volumetric flow for the exhaust blower are stored and the control device causes an output of an alarm when a measurement with a third differential pressure sensor shows that the upper limit value is exceeded or the lower limit value has fallen short.

* * * * *